No. 655,748. Patented Aug. 14, 1900.
T. A. WOOLEY & H. FOX.
MACHINE FOR SHOCKING GRAIN.
(Application filed June 26, 1899.)
(No Model.) 5 Sheets—Sheet 1.
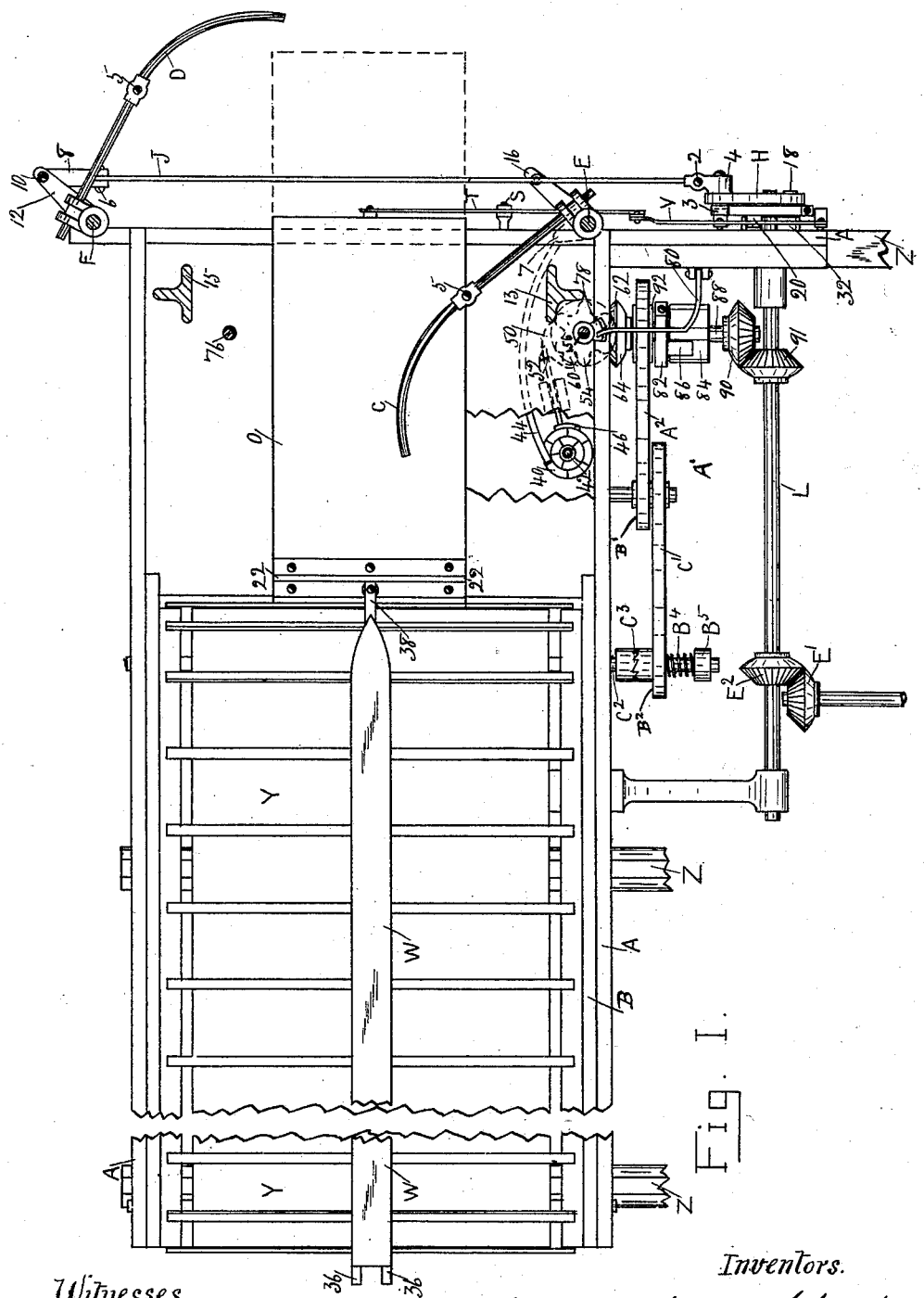
Witnesses
Jas. R. Harvey
B. E. Herald
Inventors.
Thomas Arthur Wooley and Herbert Fox.
by John K. Hendry, Atty.

No. 655,748. Patented Aug. 14, 1900.
T. A. WOOLEY & H. FOX.
MACHINE FOR SHOCKING GRAIN.
(Application filed June 26, 1899.)
(No Model.) 5 Sheets—Sheet 2.
Fig. II.
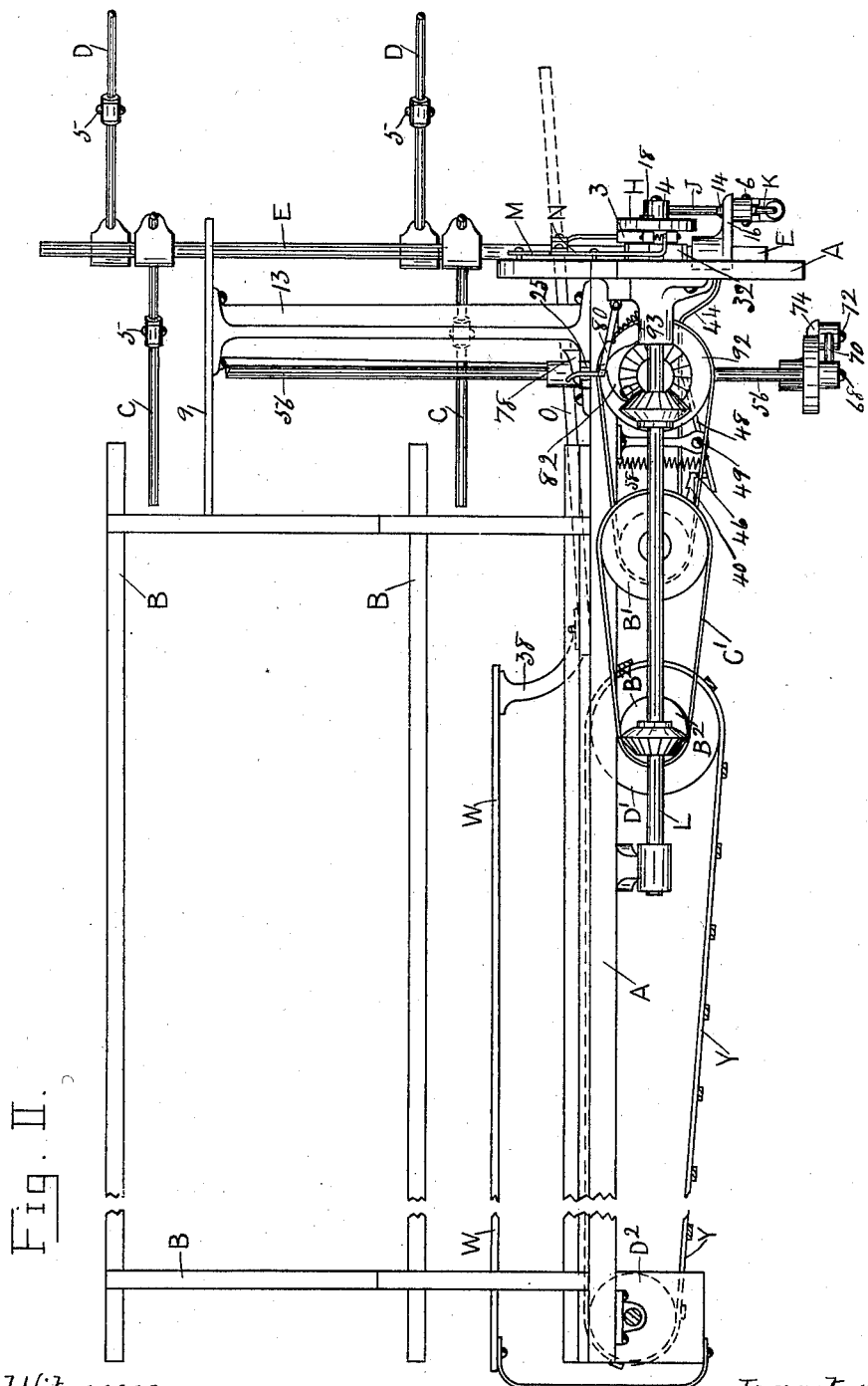
Witnesses. Inventors.
Jas. R. Harvey. Thomas Arthur Wooley and Herbert Fox
B. E. Herald. by John H. Hendry, Atty.
THE NORRIS PETERS CO., PHOTO-LITHO., WASHINGTON, D. C.

No. 655,748. Patented Aug. 14, 1900.
T. A. WOOLEY & H. FOX.
MACHINE FOR SHOCKING GRAIN.
(Application filed June 26, 1899.)
(No Model.) 5 Sheets—Sheet 3.
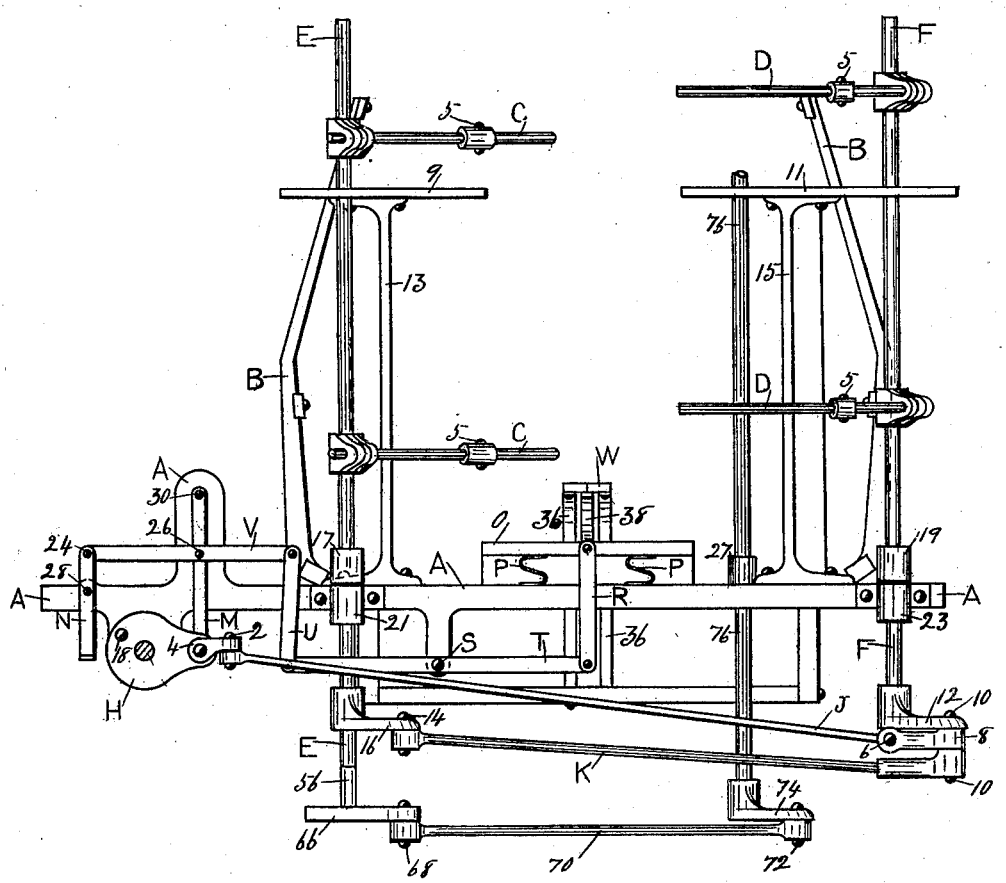
Fig. III.
Witnesses.
Jas. A. Harvey.
B. E. Herald.
Inventors.
Thomas Arthur Wooley and Herbert Fox
by John K. Hendry
atty.

No. 655,748. Patented Aug. 14, 1900.
T. A. WOOLEY & H. FOX.
MACHINE FOR SHOCKING GRAIN.
(Application filed June 26, 1899.)
(No Model.) 5 Sheets—Sheet 4.
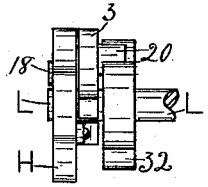
Fig. IV.
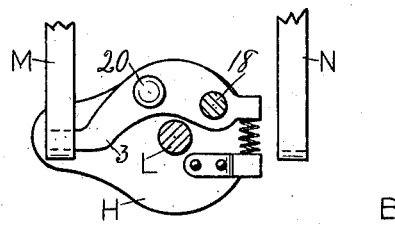
Fig. V.
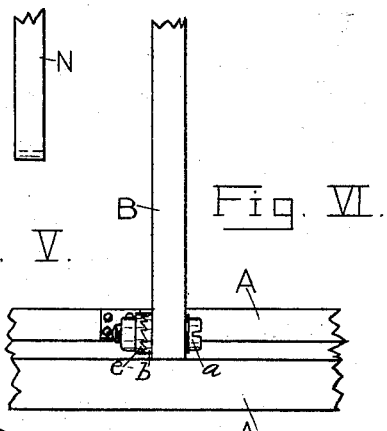
Fig. VI.
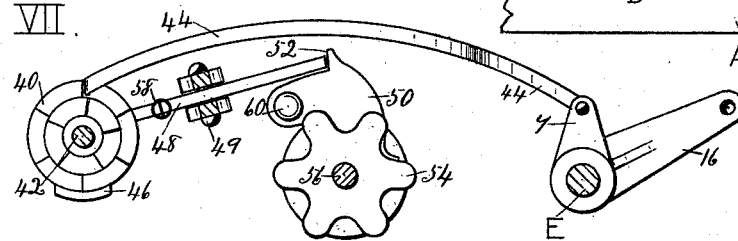
Fig. VII.
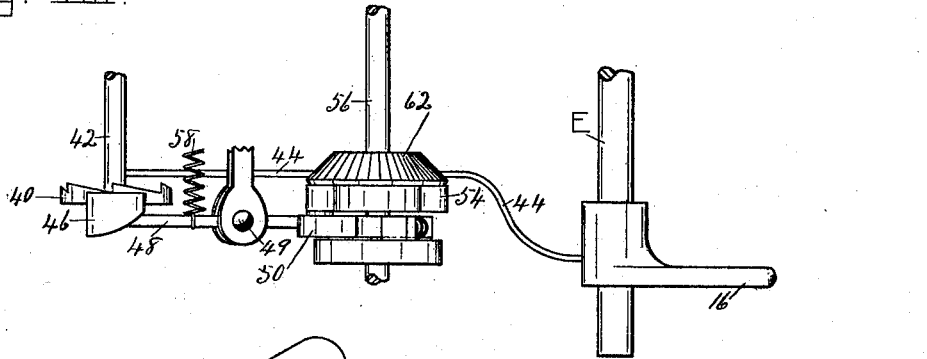
Fig. VIII.
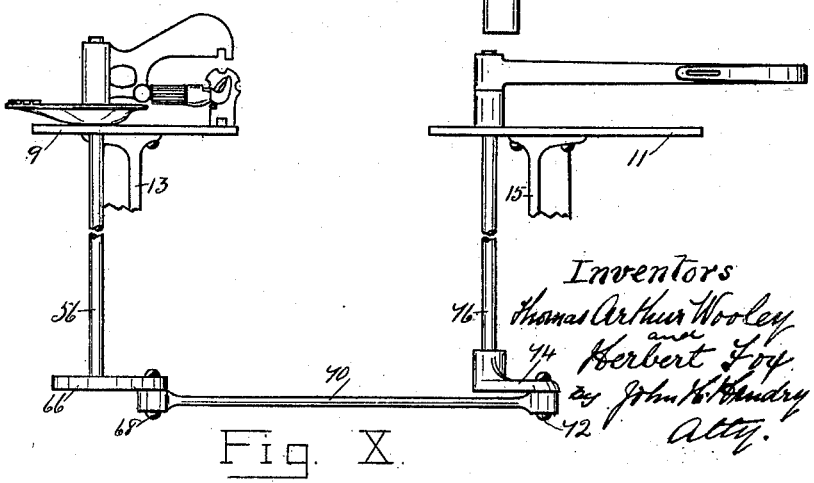
Fig. X.
Witnesses.
B. E. Herald
L. E. George
Inventors
Thomas Arthur Wooley
and
Herbert Fox
by John K. Hendry
Atty.

No. 655,748. Patented Aug. 14, 1900.
T. A. WOOLEY & H. FOX.
MACHINE FOR SHOCKING GRAIN.
(Application filed June 26, 1899.)
(No Model.) 5 Sheets—Sheet 5.
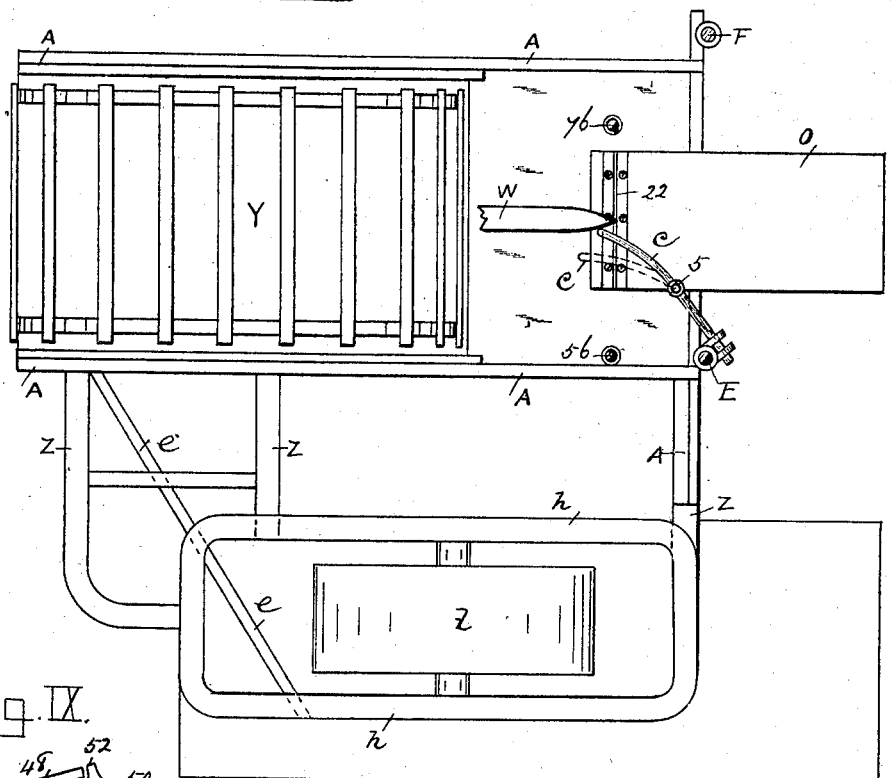
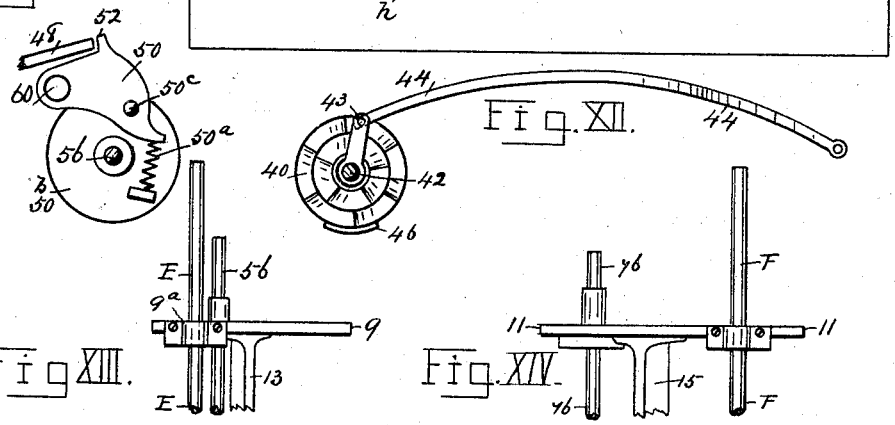
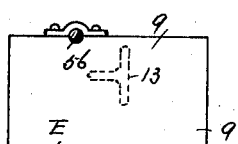
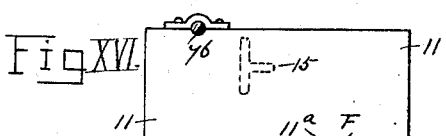
Witnesses. Inventors.
Thomas Arthur Wooley and Herbert Fox
by John K. Hendry atty.

UNITED STATES PATENT OFFICE.

THOMAS ARTHUR WOOLEY AND HERBERT FOX, OF HAMILTON, CANADA, ASSIGNORS OF ONE-HALF TO ADAM ZIMMERMAN, OF SAME PLACE.

MACHINE FOR SHOCKING GRAIN.

SPECIFICATION forming part of Letters Patent No. 655,748, dated August 14, 1900.

Application filed June 26, 1899. Serial No. 721,886. (No model.)

*To all whom it may concern:*

Be it known that we, THOMAS ARTHUR WOOLEY and HERBERT FOX, citizens of Canada, residing at Hamilton, in the county of Wentworth and Province of Ontario, Canada, have invented new and useful Improvements in Machines for Shocking Grain, of which the following is a specification.

Our invention relates to improvements in machines for shocking grain in which a framework of approved construction may be suitably attached to a reaper and binder and capable of receiving sheaves therefrom and discharging the sheaves when formed into a shock.

The objects of our invention are, first, to provide a light and durable machine for shocking grain; second, to provide a machine which is operated by means of mechanism connected with a reaping and binding machine, and, third, to afford facilities for the operation and regulation of the several parts of the shocking-machine in their relation to the carrier and to operate the same at the proper appointed time. We attain these objects by the mechanism illustrated in the accompanying drawings, in which—

Figure 1 is a plan of the machine, with the sides removed, the carrier shown broken, and also a part of the machine being broken away in order to show the operative counter or denotator. Fig. 2 is a side elevation of the machine, the sides and carrier shown broken; and Fig. 3 is a front elevation of the same, the carrier and the counter being removed. Fig. 4 is an enlarged end elevation in detail of the loosely-fitting driving-crank with its catch engaged with the clutch-wheel secured on the drive-shaft. Fig. 5 is an enlarged side elevation of the loosely-fitting crank, with its catch and stops. Fig. 6 is an enlarged side elevation of the adjustable side of the frame, showing the adjusting device of the side which when the screw is loosened the ratchet-teeth disengage and allows the side to be adjusted. Fig. 7 is an enlarged plan of the counter, the rock-shaft with its lug and lever, and the knotter-shaft with its catch and its loosely-fitting clutch-wheel. Fig. 8 is an enlarged side elevation of the same. Fig. 9 is an enlarged plan of the catch on a disk secured to the knotter-shaft and the end of the lever of the counter, and Fig. 10 is a front elevation of the knotter and the needle on their respective vertical shafts. Fig. 11 is a reduced-size diagrammatic plan view of a part of the shock-machine attached to the discharging side of a binder-machine, the spring-board of the shocker being hinged to the floor of the shocker at a proper place to allow the shock, when being bound, to rest on said floor and on the carrier. The spring-board is located opposite to the discharge-arms of the binder. This view also shows the hinged construction in dotted position of one of the arms C. All the arms C and D are hinged in like manner. Fig. 12 shows a device to retain the push-rod of the counter in position. Fig. 13 is an end elevation of the upper parts of a rock-shaft and the knotter-shaft in steadying-supports of the bracket 9. Fig. 14 is an end elevation of the upper parts of a rock-shaft and the needle-shaft in steadying-supports of the bracket 11. Figs. 15 and 16 are plans of Figs. 13 and 14, respectively.

Similar characters refer to similar parts throughout the several views.

In the drawings, A represents the frame of the machine, which frame should be substantially constructed in order to resist any possible vibration of the operating parts. The sides of the frame are capable of side adjustment to accommodate various sizes of sheaves that will be contained in the shock. When in operation, the sheaves are brought in between the sides B, which are adjustable by means of the screw $a$, which passes through the side B and through the ratchet-teeth $b$, secured to said side, and through the ratchet-teeth $e$, secured to the frame A by means of its rear lug. When the said screw $a$ is tightened, the side is firm. The hinged and curved arms C and D are secured on the vertical rock-shafts E and F, of which there are two, with two arms on each shaft and located at the receiving end of the sheaf and shock carrier Y. These shafts are rocked by a crank H, which operates these arms by means of the connecting-rod J, which is pivoted at 2 to a loosely-connected coupling 4 to allow the said rod J to swivel. Said coupling is journaled on the pin of the crank H. The other end of said connecting-rod J is pivoted at 6 to a coupling 8, which is pivoted at 10 to a crank 12 on the lower end of the rock-shaft F. The rod J swivels on the pivots 2 and 6 to facilitate the rocking of the shaft F by means of the rod J. Said shafts automatically operate the curved and hinged arms C and D. The hinged and curved arms referred to are so secured on their respective rock-shafts that each pair of arms alternately places a sheaf in proper and defined arrangement on the horizontal sheaf and shock carrier Y. The hinges of said arms are so arranged and devised that the sheaves will pass each set of opposite arms, the said opposite arms bending at their hinge parts 5 when the sheaf which is being placed comes in contact with said arms. This particular construction of the arms is very important in order to allow the same to perform their function.

Connected to the crank 12 and swiveling on pivot 10 is a connecting-rod K, which connects the vertical shafts E and F, said rod being pivoted at 14 to a crank 16, that operates the said rock-shaft E to operate the arms C. These hinges 5 of the arms C and D allow the sheaves to pass them while being taken in by the opposite arms. These arms C and D operate alternately by means of the connecting-rod J, which is connected to the crank H and to the rock-shaft E by means of crank 16 and connecting-rod K and to the rock-shaft F by means of the crank 12 and said connecting-rod J. This crank H makes a number of half-revolutions, according to the number of teeth contained in each set of teeth in the ratchet-wheel 40, in which the push-rod 44 engages to operate said ratchet-wheel, which forms a part of the counter or numeral-indicator, which is composed of said ratchet-wheel, push-rod, and lever 48. A catch 3 is secured to the crank H to engage with the clutch-wheel 32 by means of catch-pin 20. Said catch is journaled on the pin 18 of the said crank H, which fits loosely on the shaft L. Said crank is revolved by the catch that engages with the said clutch-wheel, operating the arms which take in the sheaves. As the crank revolves the extended part of the catch engages with the stops M and N, which throw the catch out of gear. The spring shown on Fig. 5 of the drawings is to afford proper tension to the extended part of the catch 3. As the sheaves from the binder fall upon the spring-board O, which is held by springs P and hinged to the floor or deck of the shocker, as at 22, said board drops by the weight of the sheaves which fall on the end of the board where the springs are. The link R of lever T is attached to this spring-board to operate the stops M and N. The lever T oscillates on the pivot S of the frame A by the action of the spring-board, which is operated by the falling of the sheaves, to expand the stops M and N, which releases the catch 3 to allow the arms C or the arms D to perform their function of pushing in a sheaf. A connecting-rod U connects the lever T and the lever V. The stops are connected to the rod V at 24 and at 26 and swivel on pivots 28 and 30 to allow for the expansion and for the contraction of said stops M and N, that when the sheaf falls onto the spring-board either set of arms immediately take in a sheaf. When the spring-board O gives by the weight of the sheaves, it presses one end of the lever T down, thus raising the other end of the lever, and moves the rod V, by means of the connecting-lever U, toward the center of the machine. The stops M and N move outwardly. It will be observed that the catch 3 is released from the stops M and N by the expansion of the said stops caused by the falling of the sheaf on the spring-board. Said catch engages with the clutch-wheel 32 by means of the spring shown in Fig. 5 of the drawings to cause the crank H to make another half-revolution, the sheaf being taken in by either arms C or D. The spring-board rises to its original position by its springs P and brings back the lever T and stops M and N to their original position and throws the catch 3 out of gear, stopping the crank at the half-revolution until another sheaf falls on the spring-board and releases the catch by the stops moving outwardly and allows said catch to engage with the clutch-wheel 32, the arms C and the arms D alternately taking in a sheaf. This operation takes place a number of times, as the case may be, according to the number of sheaves which go to make a shock, the arms C taking and forwarding the sheaves on the carrier on their side of the dividing-board W and the arms D taking and forwarding the sheaves on their side of the dividing-board W. As each sheaf is automatically pushed onto the carrier it slightly gives rearward to allow the other sheaves to be pushed onto the carrier.

The dividing-board W is rounded to a point at one end and located centrally above the carrier, as shown in the drawings, so as to give the sheaves a free passage to the carrier Y. The carrier and the division-board are shown broken. The division-board is held by straps 36 and the brace 38 and is parallel with the carrier.

Eight, ten, or twelve sheaves may be contained in a shock, according to the number of teeth in every circle of teeth in the ratchet-wheel 40 in which the push-rod 44 engages.

The counter is shown in Fig. 1 of the drawings, and consists of a ratchet-wheel 40, which has two circles or sets of teeth on its upper side, as shown in the drawings, and is journaled on a spindle 42. The outer set has six teeth and the inner set has five teeth.

The rod 44 is capable of engaging with either the outer or the inner circles or sets of teeth, as shown. A third set of teeth may be added thereto in order to form an eight-sheaf shock. The said push-rod is loosely pivoted to a crank 7 on the rock-shaft E and rocks with the said shaft. The end of the rod 44 is pivoted to a strap 43, which is capable of rotating loosely on the spindle 42 to retain the rod 44 in position to engage the teeth of wheel 40. When the said rod engages automatically with the outer set of teeth, the machine takes in twelve sheaves and discharges them, and when the rod engages automatically with the inner set of teeth ten sheaves are taken in and discharged. At every inward movement of the crank 7, which is operated by the shaft E, the ratchet-wheel 40 revolves the length of a tooth by the rod 44 engaging with the teeth.

The ratchet-wheel 40 has a projection 46, as shown, engaging with the counter-lever 48, which is fulcrumed at 49 and when in original position butts against the catch 50 at 52 to prevent the vertical knotter-shaft 56 from revolving, and when the projection 46 engages with the end of the lever 48 it is pressed down, and the other end necessarily rises and releases the catch 50, which is held by a tension-spring, and when said lever is raised by the projection 46 said catch engages with the clutch-wheel 54, that revolves loosely on a vertical knotter-shaft 56. The catch 50 engages the wheel 54 by means of a spiral spring $50^a$, which connects to a lug on the disk $50^b$. This catch 50 is pivoted to said disk at $50^c$. This catch 50 is secured to the knotter-shaft, and when it engages with the clutch-wheel 54 it revolves the said shaft around until the catch butts against the end of the lever 48. This lever is brought back into its original position by means of the tension-spring 58 pulling on said lever. When the projection 46 has passed the lever, and the catch has butted against the lever, the pin 60, of catch 50, is drawn from the teeth of the clutch-wheel 54. The ratchet-wheel referred to, with its projection, is actuated by the push-rod 44. The said projection slides over the lever 48, and at the same time presses the lever 48 downward and releases the catch 50, which is secured to the lower end of the knotter-shaft, to allow said catch 50 to engage with the clutch-wheel 54, which revolves loosely on the knotter-shaft, to revolve said knotter-shaft once. These in conjunction with the lever 48, butting against the projection 52 on the catch 50, hold the knotter-shaft stationary. The spiral spring in Fig. 5 of the drawings is connected to a lug on the disk H and to the catch 3, said catch to engage with the clutch-wheel 32 when the stops M and N are moved outward by the falling of the spring-board. The knotter-shaft is driven by means of the clutch-wheel 54, which revolves loosely on the knotter-shaft by the miter-wheel 64 gearing with the miter-wheel 62 on the said knotter-shaft. This knotter-shaft has a crank 66 at its lower end to operate the needle-shaft 76 and rock the same by means of the connecting-rod 70 and the crank 74. One end of this connecting-rod 70 is pivoted at 68 to said crank, and the other end of said connecting-rod 70 is pivoted at 72 to the lever 74 at the lower end of the vertical needle-shaft to rock the same when the knotter-shaft revolves one revolution.

The horizontal bearing 9 steadies the rock-shaft E and the knotter-shaft, and the bearing 11 steadies the needle-shaft and the rock-shaft F. The bearing 9 is supported on the column 13 and the bearing 11 on the column 15. The vertical rock-shafts E and F are held in position by their respective collars 17 and 19, which rest on their respective bearings 21 and 23, which are secured to the frame A, which allows said shafts to rock freely. The upper parts of said shafts pass through the steadying-supports $9^a$ and $11^a$, which are secured to the brackets 9 and 11, respectively. This knotter-shaft and this needle-shaft are shown broken, and operate at their upper ends a suitable needle and knotter, with sheaf-accommodating cord from one to the other to take the sheaves as they pass along on the carrier, and, when the shock is formed, the needle and knotter operate on their respective shafts and bind the sheaves together. Collars 25 and 27 are secured on the shafts referred to and rest on the frame A of the machine to hold the said shafts in their place.

Secured to the knotter-shaft 56 is a catch 78, that when the shaft revolves the said catch lifts the spring-arm 80 to release the catch 82, which allows the pin 86 to engage with the continuously-revolving clutch-wheel 84 to drive the carrier Y.

On the shaft L is the miter-wheel 91, which gears into the miter-wheel 90 to drive the shaft 88, and hence the clutch-wheel 84, on the same shaft which drives the carrier Y.

The catch 82 is secured to the inner side of a loosely-fitting chain or belt wheel 92, so that when the catch engages with the clutch-wheel 84 it revolves said wheel 92 to make one revolution to drive the carrier.

The arm 80 is brought back to its original position by means of the tension-spring 93 and stops the catch by means of said arm 80. Therefore the wheel 92 is stopped at one revolution.

This machine is attached to the reaping and binding machine by means of the connecting-beams Z and receives its power from the connected reaping and binding machine by means of the miter or bevel wheel E, geared into the miter or bevel wheel $E^2$, secured on the driving-shaft L, which has a miter-wheel 91, supported in suitable bearings of the frame A. This wheel 91 gears into the miter-wheel 90 on the transverse shaft 88 in suitable bearings of the frame. This shaft 88 is provided with a chain or belt wheel 92, which drives a chain or belt wheel B' on a rigid journal by means of a chain or belt $A^2$. The wheel B' on the said rigid journal is on the same hub and a part of the belt-wheel A' and revolves with it and drives the wheel $B^2$ by a chain or belt C'. The wheel $B^2$ is loose on the shaft $C^2$ and engages with the clutch $C^3$ to drive the shaft $C^2$, said shaft driving the carrier Y, which is supported on the chain or belt wheels D' and D² for discharging the shock. The clutch C³ allows for the rearward movement of the carrier Y. This carrier is driven toward the discharging end of the machine by the rock-shaft's arms moving the sheaves on the said carrier. Hence the carrier is moved by the sheaves to the inner end of the machine. The part of the clutch C³ is secured to the shaft C². The other part of said clutch is loose on the shaft C² and forms a part of the wheel B². The sets of teeth of the clutch C³ are arranged so that the set of teeth secured to the shaft C² shall pass over the other set of teeth, which are a part of the wheel B², to facilitate the movement of the carrier by the sheaves, while the carrier-driving mechanism is stationary. The wheel B² is held against the clutch C³ by a tension-spring B⁴, which butts against said wheel and a collar B⁵, secured on the shaft C².

The shock-machine is shown attached to a reaper and binder machine by means of bars Z and stay-rod e. The spring-board of the shocker is hinged to the floor of the shocker at a proper place to allow the shock when being bound to rest on said floor and on the carrier. The spring-board is positioned to be capable of receiving the sheaves as they are discharged from the binder.

$h$ is the binder-frame, and $d$ is the ground drive-wheel.

The machine receives its motion from the binding-machine through the medium of a miter-wheel E', geared into the miter-wheel E², secured on shaft L, as previously mentioned.

The most important features and principal elements in the construction of this machine are the counter or numeral-indicator, the horizontal sheaf and shock carrier, the vertical knotter-shaft, the vertical needle-shaft, and the curved and hinged arms on vertical rock-shafts.

Various changes in the form, size, and proportion of our invention may be resorted to without departing from the spirit and scope thereof.

Hence what we claim as our invention, and desire to secure by Letters Patent, is—

1. A machine for shocking grain comprising the combination of a carrier, adjustable sides, and a dividing-board above said carrier, rock-shafts E and F with arms at the receiving end of the carrier, a drive-shaft, a crank having a catch and mounted to revolve loosely on said shaft, a clutch-wheel secured to said shaft and engaged by the catch, a spring-board, stops for said catch operated by the spring-board, a lever connected to the spring-board to expand and contract the stops to allow half-revolution of the crank on the reception of each sheaf on the spring-board, to alternately operate the arms, a counter operated by the rock-shaft E, the knotter-shaft and the needle-shaft set in operation through the medium of the counter as described.

2. In a machine for shocking grain, a frame having adjustable sides, a carrier in said frame, a dividing-board parallel with and above said carrier, and rounded at the receiving end to a point, a hinged spring-board at the receiving end of the carrier, vertical rock-shafts E and F with arms, at the receiving end of the carrier, cranks at the lower ends to operate said rock-shafts and arms, a crank having a catch, a driving-shaft, a clutch-wheel secured to said shaft, said crank with catch mounted loosely on said shaft and by means of said catch engaging with said clutch-wheel, a lever connected to the spring-board to operate said stops to allow half-revolution to the crank on the reception of each sheaf on the spring-board to alternately operate the arms and a counter operated by the rock-shaft E, as described.

3. A machine for shocking grain consisting of a frame, the adjustable sides, a carrier in said frame, a dividing-board parallel with and above said carrier, a spring-board at the receiving end of the machine, said board being operated by the sheaves, vertical rock-shafts E, and F, with arms at the receiving end of the carrier, a shaft L, a crank to revolve loosely on said shaft to operate the rock-shafts, a catch on the crank, a clutch-wheel secured to the shaft, stops for the catch operated by said spring-board, a shaft 88, the carrier drive-wheel to revolve loosely on shaft 88, and to revolve once to discharge the shock, a clutch on the forward shaft of the carrier, the counter operated by the rock-shaft E, and mechanism regulated by said counter to set the carrier drive-wheel in operation, as described.

4. A machine for shocking grain comprising a frame and adjustable sides, a carrier at the discharging end of said frame, a dividing-board above said carrier, a hinged spring-board at the receiving end of said frame, supporting-springs at the receiving end of said spring-board to allow said board to yield by the weight of the sheaves, stops on the frame to move outwardly as the sheaves fall upon the spring-board, a crank with catch engaged by the stops and released by the sheaves falling on the spring-board, rock-shafts E and F with arms operated by said crank, a crank on rock-shaft E, a ratchet-wheel worked by a push-rod pivotally connected to said crank, the catch 50 on the knotter-shaft, said catch released by a lever 48, to operate the carrier as described.

5. A machine for shocking grain consisting of a frame with adjustable sides, a carrier in said frame, a dividing-board above the carrier, a spring-board at the receiving end of the carrier, a shaft L, a loosely-fitting crank H, on said shaft, a catch 3, the stops M, and N, to engage the catch 3, said catch released by the falling of the sheaves on the spring-board, the shaft E, having a crank 7, a ratchet-wheel 40, operated by said crank, a knotter-shaft and catch 50, at the receiving end of the frame, a lever 48, which is intermittently operated by a projection on said wheel 40, said catch released by the lever, to allow the knotter-shaft to turn one revolution, a needle-shaft opposite to said knotter-shaft, a crank on the lower end of the knotter-shaft, said crank connected to a crank on the needle-shaft to operate the same, said carrier operated by said shaft L, through the medium of mechanism, as described.

6. A machine for shocking grain comprising a frame with adjustable sides, a carrier at the receiving end of said frame, a dividing-board above said carrier, the vertical rock-shafts, a spring-board at the receiving end of the frame, stops pivoted to the frame and operated by the spring-board, a crank H, a catch 3, on said crank regulated by the stops, a drive-shaft L, and arms on the rock-shafts to take in the sheaves.

7. A machine for shocking grain consisting of a frame with adjustable sides, a carrier in said frame, a dividing-board parallel with and above said carrier, rock-shafts with arms at the receiving end of the frame, a drive-shaft L, a crank H, fitting loosely on the drive-shaft, to operate said rock-shafts, a clutch-wheel 32, secured to said shaft, a catch 3, on said crank to engage with the clutch-wheel and a knotter-shaft, said carrier revolved by the operation of the knotter-shaft, as described.

8. In a machine for shocking grain, a frame with adjustable sides, a carrier at the discharging end, a transverse shaft at the receiving end of carrier, a ratchet on said shaft, the wheel having a ratchet-face engaging the ratchet to operate said carrier, rock-shafts with arms on each said shaft at the receiving end of the carrier, a drive-shaft L, a loosely-fitting crank with catch on said shaft, to operate said rock-shafts, to alternately operate the arms, as described.

9. A machine for shocking grain consisting of a frame with adjustable sides and containing a carrier, a division-board parallel with and above said carrier, a spring-board at the receiving end of the machine, the stops M, and N, pivoted to the frame, a catch 3, that engages with the stops, a drive-shaft L, a loosely-fitting crank H, on the drive-shaft, the rock-shafts, the jointed arms on the rock-shafts, the rods J, and K, a counter operated by one of the rock-shafts, said counter consisting of a ratchet-wheel 40, having a projection 46, a lever 48, engaged by said projection, a knotter-shaft, a catch 50, released by said lever and secured to the knotter-shaft to revolve it once, a catch 78, on said knotter-shaft, a spring-arm 80, engaged by the catch, a catch 82, engaged by the spring-arm, a shaft 88, a clutch-wheel secured thereto, with belt-wheels to drive the carrier, as described.

10. In a grain-shocking machine a pair of double sheaf-placing arms on vertical rock-shafts opposite to each other at the receiving end of the machine, a spring-board between said rock-shafts, stops at the receiving end of the machine, said stops widened at the reception of a sheaf on the spring-board, a loosely-fitting crank carrying a catch and a pin on said catch, said crank on the drive-shaft released by said stops, a continuously-revolving clutch-wheel secured to said drive-shaft to receive the pin 20 of said catch to revolve said crank one half-revolution, and to disengage said clutch-wheel by the contracting of said stops when the spring-board has resumed its original position, as described.

11. In a machine for shocking grain, a frame attached to a binding-machine, a sheaf and shock carrier in said frame, vertical rock-shafts opposite to each other and at the sheaf-receiving end of the frame, arms secured to said rock-shafts, said arms on each rock-shaft curved inwardly and hinged midway of their length to pass each other and allow the sheaves to pass the opposite arms when alternately operating to take in the sheaves, as described.

12. In a machine for shocking grain, a counter consisting of a ratchet-wheel with sets of teeth and a projection, said counter being loosely journaled on the frame, a vertical rock-shaft E, with crank and rod to operate said ratchet-wheel, a catch 50, a lever to engage with said catch, the knotter-shaft, and a number on said shaft to coöperate with the catch, said ratchet-wheel projection intermittently engaging the said lever to release the catch of the knotter-shaft and permit the same to revolve, as described.

In testimony whereof we affix our signatures in presence of two witnesses.

THOMAS ARTHUR WOOLEY.
HERBERT FOX.

Witnesses:
JOHN H. HENDRY,
B. E. HERALD.